United States Patent [19]

Palfreyman et al.

[11] 4,330,133

[45] May 18, 1982

[54] DUAL-RING SEAL WITH TEMPERATURE COMPENSATION

[75] Inventors: Jack Palfreyman, Tansley near Matlock; James P. Angus, Stone; John M. Robertson, Derby, all of England

[73] Assignee: Rolls-Royce Limited, London, England

[21] Appl. No.: 274,884

[22] Filed: Jun. 18, 1981

Related U.S. Application Data

[63] Continuation-in-part of Ser. No. 111,187, Jan. 11, 1980, abandoned.

[30] Foreign Application Priority Data

Feb. 17, 1979 [GB] United Kingdom ................. 7905678

[51] Int. Cl.³ .......................... F16J 15/16; F16J 15/44
[52] U.S. Cl. ......................................... 277/26; 277/53;
277/54; 277/137; 277/174; 277/178; 277/183;
277/198; 277/208
[58] Field of Search ........................................ 277/5–8,
277/30, 31, 53, 54, 26, 136, 137, 138, 151,
173–176, 178, DIG. 6, 182–185, 198, 207 R, 208

[56] References Cited

U.S. PATENT DOCUMENTS

| | | | |
|---|---|---|---|
| 957,286 | 5/1910 | Wilson | 277/54 X |
| 957,887 | 5/1910 | Junggren | 277/54 X |
| 2,998,991 | 9/1961 | Spencer | 277/53 X |
| 3,082,011 | 3/1963 | Kroekel | 277/151 X |
| 3,186,724 | 6/1965 | Wheatley | 277/174 X |
| 3,273,906 | 9/1966 | Pennington | 277/53 X |
| 3,392,910 | 7/1968 | Tanzberger | 277/53 X |
| 4,120,506 | 10/1978 | Perkins | 277/208 X |

FOREIGN PATENT DOCUMENTS

| | | | |
|---|---|---|---|
| 519979 | 3/1931 | Fed. Rep. of Germany | 277/30 |
| 888789 | 9/1953 | Fed. Rep. of Germany | 277/53 |
| 1019636 | 11/1952 | France | 277/198 |
| 233961 | 5/1925 | United Kingdom | 277/175 |
| 488273 | of 1938 | United Kingdom | 277/208 |
| 643604 | 9/1950 | United Kingdom | 277/53 |

*Primary Examiner*—Robert S. Ward, Jr.
*Attorney, Agent, or Firm*—Cushman, Darby & Cushman

[57] ABSTRACT

A seal arrangement suitable for sealing between two coaxially mounted, axially restrained, radially spaced apart and relatively rotatable members comprises two concentric, ring-shaped seal elements having adjacent sealing faces. The seal elements are mounted on the respective members by a spline and groove arrangement which permits radial growth or shrinkage of the relatively rotatable members due to their thermal expansion or contraction without such growth or shrinkage being transferred to the seal elements. The arrangement insures that the gap between the sealing faces of the seal elements remains substantially constant during thermal variations.

8 Claims, 3 Drawing Figures

DUAL-RING SEAL WITH TEMPERATURE COMPENSATION

This application is a continuation-in-part application of our copending U.S. application Ser. No. 111,187, filed Jan. 11, 1980 (now abandoned).

This invention relates to seals and in particular to seals between rotatable members.

One of the more effective ways of providing sealing between relatively rotatable members is to utilise a seal element which is in physical contact with each of the members concerned. Whilst such seals are satisfactory in applications where the relative velocities of the members are not high, their effectiveness and life are usually drastically reduced if high relative velocities are encountered. A common way in which this problem is avoided is to provide a seal having two elements, one attached to each of the relatively rotatable members. A small gap is left between the seal elements so that high velocity relative rotation between the members is possible whilst leakage across the small gap is maintained at acceptably low levels. Such seals are effective if the gap between the seal elements is small and substantially constant. However if the rotatable members are subject to temperature gradients and variations during operation, the gap between the seal elements is likely to alter due to differing rates of thermal expansion of the members and indeed the seal elements. Consequently the effectiveness of the seal is usually reduced either by the widening of the seal gap or alternatively narrowing of the gap with the attendant danger of contact occurring between the rotating seal elements.

It is an object of the present invention to provide a rotary seal comprising two spaced apart elements whereby the gap between the seal elements remains substantially constant during variations of temperature.

According to the present invention, a seal suitable for sealing between two coaxially mounted, relatively rotatable members comprises two concentric, ring-shaped seal elements having adjacent sealing faces, and substantially similar or identical rates of thermal expansion said two seal elements being interposed between said two relatively rotatable members, one of each of said seal elements and its adjacent member having a plurality of radially extending projections and the other of each said seal elements and its adjacent member having a plurality of corresponding recesses to receive and engage said projections in such a manner as to retain said seal elements in coaxial relationship and provide that any radial growth and shrinkage of said relatively rotatable members due to their thermal expansion and contraction is not transferred to said seal elements, said relatively rotatable members being provided with annular retaining means to axially retain said seal elements and provide a seal between each of said seal elements and its adjacent member.

Each of said retaining means preferably comprises a circumferentially extending channel in each of said relatively rotatable members, each of said seal elements being slidingly and sealingly mounted in its respective channel so as to be retained axially thereby.

Said radially extending projections preferably consist of splines and said recesses consist of grooves to receive and engage said splines, the splines or grooves being dimensioned such that radial gaps are provided between each spline and the base of its corresponding groove to permit said radial growth or shrinkage, and are arranged such that said relatively rotatable members and the respective seal elements associated therewith, are maintained in coaxial relationship. Thus, the seal elements rotate relative one another just as the relatively rotatable members.

The adjacent sealing faces of said seal elements may be so shaped that together they define a labyrinth seal.

The seal elements are preferably formed from a material having a low coefficient of thermal expansion and high specific stiffness, for instance carbon foam, a ceramic material or a composite material comprising carbon fibres enclosed in a matrix of carbon.

If the material from which the seal elements are formed is prone to oxidation at elevated temperatures, we prefer to coat them with an anti-oxidation material such as a ceramic.

The invention will now be described, by way of example, with reference to the accompanying drawings in which.

Figure 1:
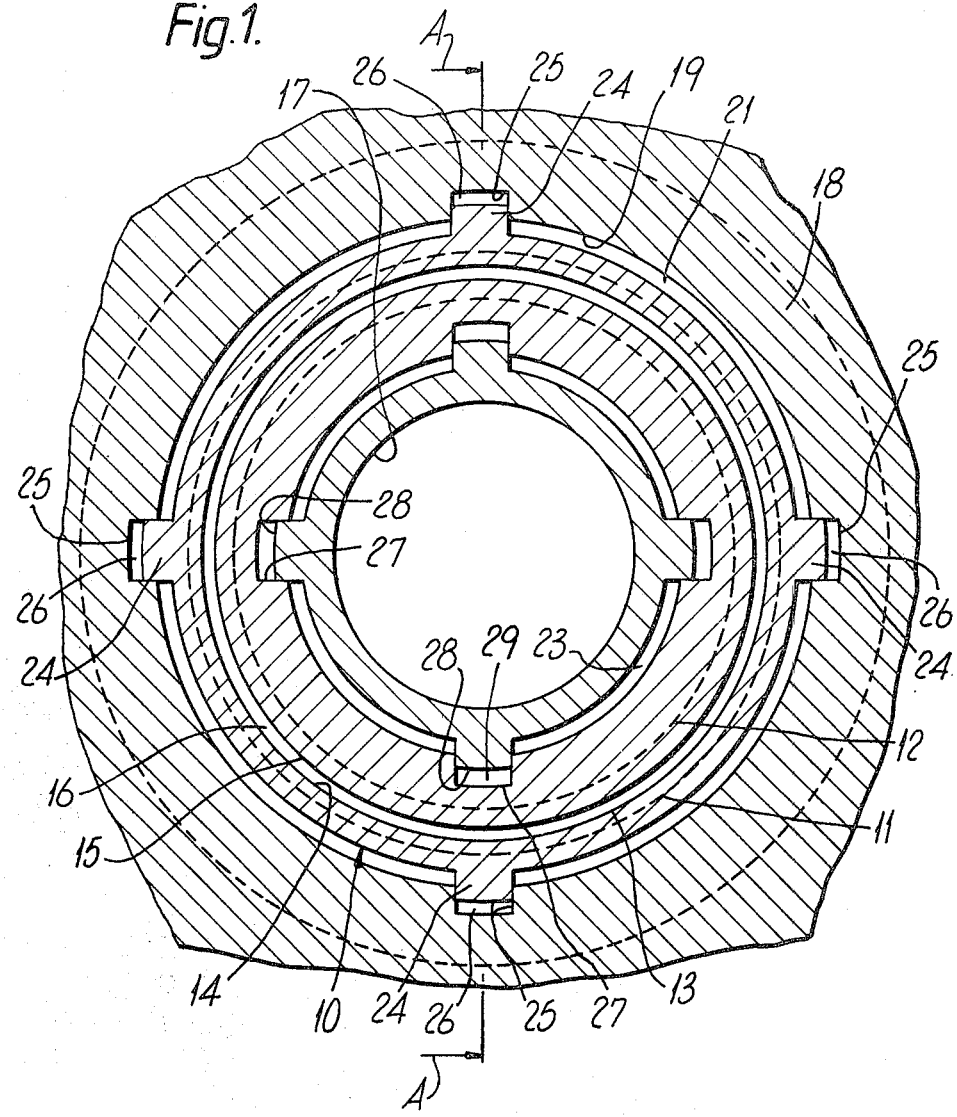
FIG. 1 is a transverse sectional view of a seal in accordance with the present invention, the view being taken on section line B—B of FIG. 2.
Figure 2:
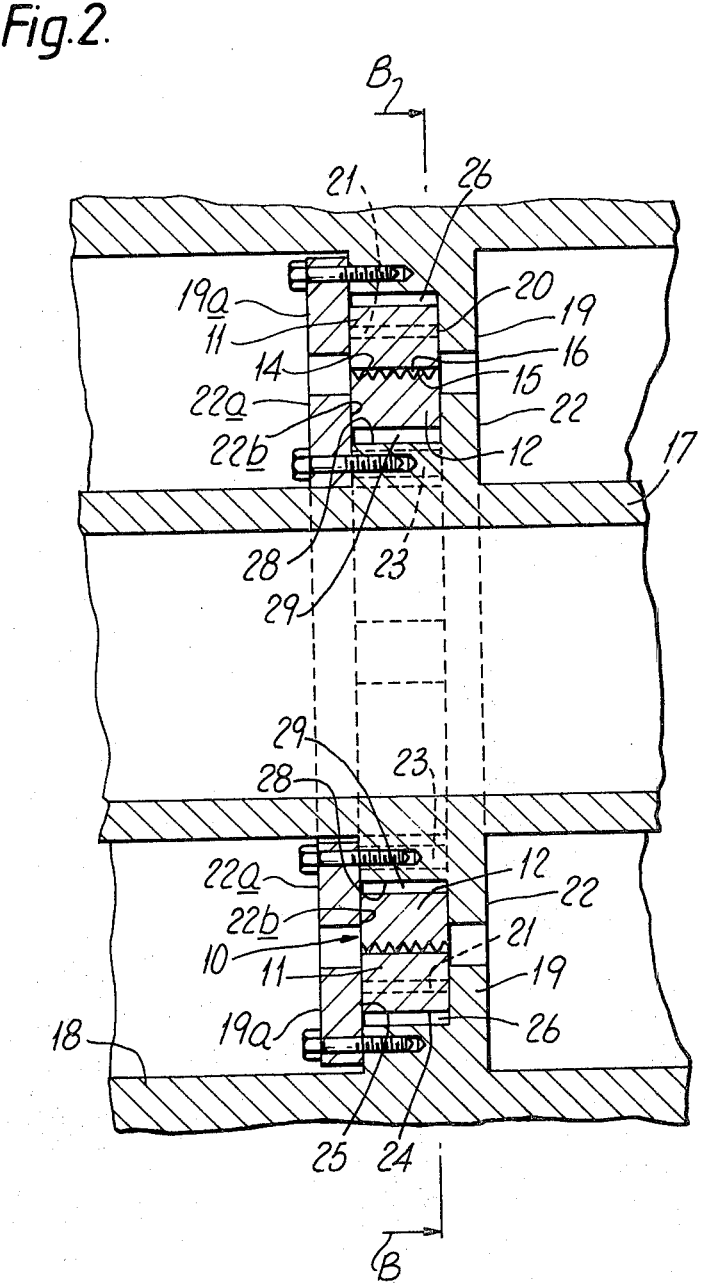
FIG. 2 is a view on section line A—A of FIG. 1.

With reference to FIG. 1, the seal arrangement of the present invention includes a seal generally indicated at 10 comprising two ring-shaped seal elements 11 and 12 respectively which are concentrically positioned with a very small gap 13 separating their sealing faces 14 and 15 (FIG. 2). The sealing face 14 of the radially outer seal element 11 is smooth but the sealing face 15 of the radially inner element 12 is provided with a series of circumferentially extending grooves 16 so that together, the sealing faces 14 and 15 define a labyrinth seal. It will be appreciated however that other forms of seal configuration could be utilised. For instance, one of the sealing faces 14 and 15 could be provided with a fibrous surface composed of, for instance upstanding whiskers.

The seal elements 11 and 12 are both formed from a composite material comprising carbon fibres enclosed in a carbon matrix. This material has high specific stiffness ensuring minimal radial growth as well as a low coefficient of thermal expansion ensuring minimal variation in seal clearance with temperature variation. Consequently if the seal elements 11 and 12 are subjected to variations in temperature, the gap 13 between them will remain substantially constant.

The seal elements 11 and 12 are coated with a ceramic in order to resist oxidation of the carbon/carbon fibre composite material at elevated temperatures. If, however, the seal 10 is not intended to operate under strongly oxidising conditions, the ceramic coating may be omitted. It will be appreciated that other materials having low coefficients of thermal expansion and high specific stiffness, such as carbon foam or a ceramic, could be used instead of the carbon/carbon fibre composite material.

The seal elements 11 and 12 are adapted to provide a gas seal between two coaxially mounted relatively rotatable members 17 and 18 which are restrained (by means not shown) against relative axial movement. In this particular case, the inner member 17 is a hollow gas turbine engine shaft adapted to rotate relative to the outer member 18 which is fixed gas turbine engine structure but it will be appreciated that the present invention is applicable to any combination of relatively rotatable members which are restrained against relative axial movement. The outer member 18 is provided with a radially inwardly and circumferentially extending flange 19 to which a ring member 19a, defining a second radially inwardly and circumferentially extending flange, is bolted so that together, the flanges 19 and 19a, define a circumferentially extending channel 20 in which the outer seal element 11 is slidingly and sealingly mounted as well as being retained axially. A radial gap 21 is, however, provided between the outer member 18 and the outer seal element 11 so as to permit relative radial movement between them. The flange 19 and ring member or removable flange 19a are in sliding engagement with the outer seal element 11 in order to allow such relative radial movement to take place. The dimensions and coefficients of thermal expansion of the outer seal element 11 and the outer member 18 are chosen such that the outer seal element 11 is not gripped by the outer member 18 under the thermal conditions expected to be encountered during operation of the seal.

The inner member 17 is similarly provided with a radially inwardly and circumferentially extending flange 22 to which a ring member 22a, defining a second radially inwardly and circumferentially extending flange is bolted so that together the flanges 22 and 22a define a circumferentially extending channel 22b in which the inner seal element 12 is slidingly and sealingly mounted as well as being retained axially. Again a radial gap 23 is provided between the inner member 17 and the inner sealing element 12 so as to permit relative radial movement between them. The ring members 19a and 22a are arranged to be removable in order to facilitate the location of the seal elements 11 and 12 in the channels 20 and 22b respectively.

Although in the present embodiment, sealing between the flanges and ring members 19, 19a, 22 and 22a, and seal elements 11 and 12 is provided by their sliding abutment, it will be appreciated that under certain circumstances, it may be desirable to locate a compressible sealing material between the flanges 19 and 22 or the ring members 19a and 22a and the inner and outer seal elements 11 and 12 in order to ensure complete sealing between them under extremes of relative thermal expansion and contraction.

It is clear, therefore, that the seal elements 11 and 12, whilst being retained axially by the flanges 19 and 22 and ring members 19a and 22a are free to move radially relative to the inner and outer members 17 and 18.

Figure 3:
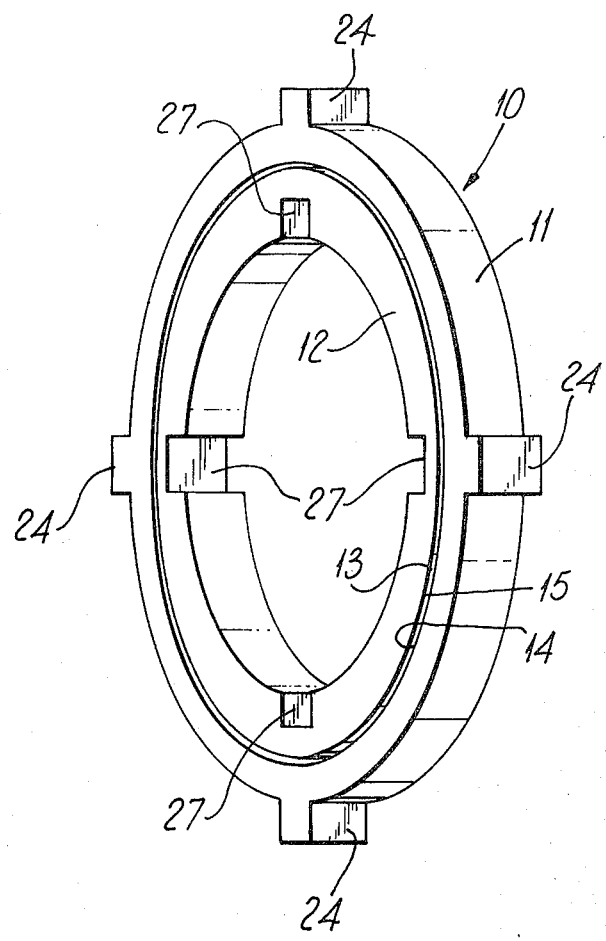
FIG. 3 is a perspective view of the seal elements of the seal shown in FIG. 1.

The outer seal element 11 is provided on its radially outer periphery with four equally spaced apart axially extending splines 24 as can be seen in FIG. 3 which are adapted to locate in corresponding axially extending grooves 25 provided on the radially inner periphery of the channel 20. A radial gap 26 is provided between each spline 24 and the base of its corresponding groove 25 in order to permit the previously mentioned relative radial movement of outer seal element 11 and outer member 18. However, since the splines 24 are equally spaced around the outer seal element 11, any such radial movement is limited to relative radial growth and shrinkage of the outer member 18 and outer seal element 11 due to their thermal expansion or contraction. Thus the splines 24 and grooves 25 ensure that the outer seal element 11 and outer member 18 are maintained in a fixed coaxial relationship to one another.

Similarly the inner seal element 12 is provided on its radially inner periphery with four equally spaced apart axially extending grooves 27 which are adapted to receive corresponding axially extending splines 28 provided on the radially inner periphery of the channel 22b. Radial gaps 29 provided between each spline 28 in the base of its corresponding groove 27 restrict relative movement of the inner seal element 12 and the inner member 17 to relative radial growth and shrinkage with a fixed coaxial relationship to one another.

It will be seen therefore that since the inner and outer seal elements 11 and 12 are respectively located on the inner and outer members 17 and 18 by the previously described spline and groove arrangement they are all maintained in coaxial relationship with the seal element 12 rotating with inner member 17 and relative to seal element 11 and outer member 18. Moreover, since relative radial movement between the inner and outer members 17 and 18 and the inner and outer seal elements 11 and 12 is limited to radial growth and shrinkage, the inner and outer seal elements 11 and 12 are not affected by any radial growth or shrinkage of the inner and outer members 17 and 18. This means that if, during operation, thermal expansion or contraction of the inner and outer members 17 and 18 occurs, it will be independent, in the radial sense, of any thermal expansion or contraction of the inner and outer seal elements 11 and 12. Since the inner and outer seal elements 11 and 12 are formed from the same material, then the gap 13 between them will remain substantially constant. The gap 13 may thus be arranged to be very small, thereby ensuring its sealing efficiency, without the danger of the sealing faces 14 and 15 being forced into contact with each other through radial loadings being imposed upon the seal elements 11 and 12 by the members 17 and 18.

Although the present invention has been described with reference to a seal located by two sets of four splines and grooves, it will be appreciated that other forms of location could be utilised. Moreover, more than four splines and grooves per set could be provided and indeed the splines and grooves could be interchanged.

We claim:

1. A seal arrangement comprising two coaxially mounted and axially restrained radially spaced apart relatively rotatable members and two concentric, ring-shaped seal elements having adjacent sealing faces and substantially similar rates of thermal expansion, said two seal elements being interposed between said relatively rotatable members, one of each of said seal elements and its adjacent member having a plurality of radially extending projections and the other of each of said seal elements and its adjacent member having a plurality of corresponding recesses to receive and engage said projections in such a manner as to retain said seal elements in coaxial relationship and provide that any radial growth and shrinkage of said relatively rotatable members due to their thermal expansion and contraction is not transferred to said seal elements, said relatively rotatable members being provided with annular retaining means to axially retain said seal elements and provide a seal between each of said seal elements and its adjacent member.

2. A seal arrangement as claimed in claim 1 wherein said retaining means comprises a circumferentially extending channel in each of said relatively rotatable members, each of said sealing elements being slidingly and sealingly mounted in its respective channel so as to be retained axially thereby.

3. A seal arrangement as claimed in claim 1 wherein said radially extending projections consist of splines and said recesses consist of grooves to receive and engage said splines, the splines and grooves being so dimensioned that gaps are defined between each spline and the base of its corresponding groove to permit said radial growth and shrinkage, and are arranged such that said relatively rotatable members and seal elements are maintained in coaxial relationship.

4. A seal arrangement as claimed in claim 1 wherein the adjacent sealing faces of said seal elements are so shaped that together they define a labyrinth seal.

5. A seal arrangement as claimed in claim 1 wherein said seal elements are formed from a material having a low coefficient of thermal expansion.

6. A seal arrangement as claimed in claim 5 wherein said seal elements are formed from a material having a high specific stiffness.

7. A seal arrangement as claimed in claim 6 wherein said material is selected from the group consisting of carbon foam, a ceramic and a composite material comprising carbon fibres enclosed in a matrix of carbon.

8. A seal arrangement as claimed in claim 7 wherein said seal elements are coated with an anti-oxidation coating.

* * * * *